United States Patent
Lee

(10) Patent No.: US 7,363,428 B2
(45) Date of Patent: Apr. 22, 2008

(54) MICROPROCESSOR WITH HOT ROUTINE MEMORY AND METHOD OF OPERATION

(75) Inventor: Hoi-Jin Lee, Sungnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 357 days.

(21) Appl. No.: 10/878,514

(22) Filed: Jun. 29, 2004

(65) Prior Publication Data

US 2005/0005068 A1    Jan. 6, 2005

(30) Foreign Application Priority Data

Jul. 1, 2003    (KR)    ............... 10-2003-0044292

(51) Int. Cl.
*G06F 12/00*    (2006.01)
(52) U.S. Cl. ................. 711/118; 711/125
(58) Field of Classification Search .......... None
See application file for complete search history.

(56) References Cited

U.S. PATENT DOCUMENTS

| | | | |
|---|---|---|---|
| 4,918,586 A | 4/1990 | Niimura et al. | |
| 5,249,294 A | 9/1993 | Griffin, III et al. | |
| 5,603,011 A * | 2/1997 | Piazza | 711/170 |
| 5,956,495 A | 9/1999 | Kahle et al. | |
| 6,385,721 B1 * | 5/2002 | Puckette | 713/2 |
| 6,954,822 B2 * | 10/2005 | Bains et al. | 711/5 |

FOREIGN PATENT DOCUMENTS

| | | |
|---|---|---|
| GB | 2 284 911 A | 6/1995 |
| KR | 10-0317976 | 12/2001 |
| KR | 10-0347865 | 8/2002 |

OTHER PUBLICATIONS

European Search/action: Combined Search and Examination Report under Sections 17 & 18(3) Oct. 25, 2004, Dr. Mark Shawcross.*

* cited by examiner

*Primary Examiner*—Donald Sparks
*Assistant Examiner*—Horace L. Flournoy
(74) *Attorney, Agent, or Firm*—Harness, Dickey & Pierce, PLC

(57) ABSTRACT

Information designated as a hot routine by an application program is stored in a hot routine memory of the microprocessor system. A processor requests information, and a controller controls the hot routine memory to output information requested by a processor when the hot routine memory stores the requested information. The controller includes address translation information to translate the address used in the request from the processor to an address of the information in the hot routine memory.

24 Claims, 5 Drawing Sheets

Fig. 3
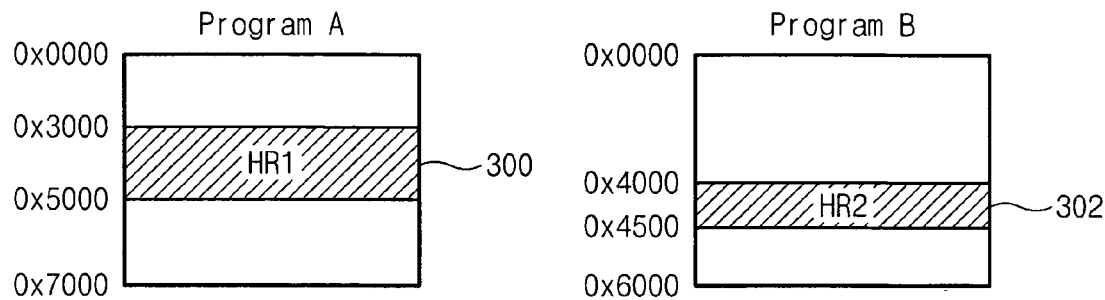
Fig. 4
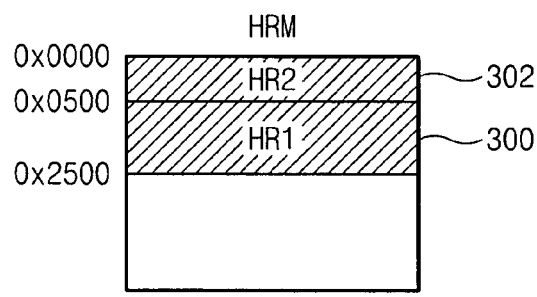
Fig. 5
| PID | Address (Program) | End Address (HRM) | Start Address (HRM) |
|---|---|---|---|
| B | 0x4000 | 0x04fc | 0x0000 |
| A | 0x3000 | 0x24fc | 0x0500 |

MICROPROCESSOR WITH HOT ROUTINE MEMORY AND METHOD OF OPERATION

BACKGROUND OF THE INVENTION

1. Field of the Invention

The present invention relates to microprocessor systems and, more specifically, to a microprocessor system able to store information frequently used in the execution of an application program.

2. Discussion of the Related Art

Generally speaking, the operation speed of a microprocessor system suffers when data is read/written. A processor in the system must connect to a storage device storing information (e.g., data and commands) to execute an application program, and this involves read/write operations. These storage devices, such as a hard disk or DRAM (Dynamic Random Access Memory), operate relatively slowly as compared to the processor. To solve these problems, most microprocessor systems employ an additional cache memory, which is embodied by memory devices such as SRAM (Static Random Access Memory), having a relatively fast speed. In the cache memory, data and commands, which are used by processors most recently, are temporarily stored. Additionally, data and commands, predicted by processors to be needed in the near future, may be stored. As a result, it is possible to improve operation speed by shortening the time to access data necessary to execute an application program. Recently, for the purpose of improving performance of microprocessor systems, numerous cache memories together with processors have been integrated onto one chip.

FIG. 1 is a block diagram of a conventional microprocessor system employing a cache memory. As shown, the conventional microprocessor system includes a processor 100, a cache controller 104, a storage device 108 and a bus 106. The processor 100 controls the entire microprocessor system such as reading information through the bus 106 from the storage device 108 or from the cache memory 102. In addition, the processor 100 stores information in the storage device 108 and the cache memory 102. The cache memory 102 temporarily stores commands and data, executed and generated by the processor 100 and outputs the stored information according to a request of the processor 100. The cache controller 104 controls storing and accessing information from the cache memory 102 by managing address information for the information. The storage device 108 is embodied by a hard disk or mass storage DRAM, and stores information for executing an application program.

In this conventional microprocessor system, the processor 100 connects to the storage device 108 to read/write data and commands for the purpose of executing an application program. A command and data, which are used by the processor 100, are temporarily stored in the cache controller 104. Then, when the application program is executed by the processor 100, the processor 100 first attempts to retrieve the information from the cache controller 104. If necessary information exists in the cache memory 102, the cache controller 104 transfers the information stored in the cache memory 102 to the processor 100. However, if the information requested by the processor 100 does not exist in the cache memory 102, the processor 100 obtains the information by connecting to the storage device 108, and executed data is stored through the cache controller 104 in the cache memory 102.

Accordingly, in microprocessor systems based on a conventional cache, if a context switch occurs, it is essential to delete cache entries used in execution of the application program from the cache in order to execute a next application program. These operations are referred to as "flush & fill" operations. However, as a result of the flush & fill operation, an operation speed of the system becomes slow.

SUMMARY OF THE INVENTION

According to one exemplary embodiment of the present invention, the microprocessor system includes a processor and a storage device connected to the processor. The storage device is configured to store information for executing an application program. The microprocessor further includes a hot routine memory controlled by the processor. The hot routine memory is configured to store a portion of the information stored in the storage device designated by the application program as a hot routine. For example, a hot routine is information for which a fast response speed and a high connection frequency in executing the application program is desired.

In one exemplary embodiment the microprocessor system further includes a controller configured to include address translation information providing translation between an address of the hot routine in the storage device and an address of the hot routine in the hot routine memory. For example, the controller includes a hot routine address translation table, and the hot routine address translation table includes a start address of the hot routine in the storage device and a start and end addresses of the hot routine in the hot routine memory.

In another exemplary embodiment, the microprocessor system further includes a cache memory controlled by the processor. The cache memory is configured to store information previously used by the processor in executing the application program. In this embodiment, the controller controls the hot routine memory to output information requested by the processor when the memory controller determines from the address translation information that the hot routine memory stores the requested information. Also, the controller controls the cache memory to output the requested information when the controller determines that the hot routine memory does not store the requested information and the cache memory does store the requested information.

A further exemplary embodiment of the present invention provides a method of operating a microprocessor system. In the embodied method, information designated as a hot routine by an application program is stored in a hot routine memory of the microprocessor system.

According to this embodiment, the method may further include controlling the hot routine memory to output information requested by a processor when the hot routine memory stores the requested information.

The method may also include storing information, previously used by a processor of the microprocessor system in executing the application program, in a cache memory. In this embodiment, the method may include the steps of controlling the hot routine memory to output information requested by a processor when the hot routine memory stores the requested information, and controlling the cache memory to output the requested information when the hot routine memory does not store the requested information and the cache memory does store the requested information.

The present invention provides a microprocessor system having improved operating speed, particularly, with respect to accessing information (e.g., command and data) for which a fast response speed and a high connection frequency in executing an application program is desired.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 3 shows application programs including hot routines;

FIG. 4 shows regions where hot routines included in the application programs of FIG. 3 are stored in the hot routine memory of the present invention;

FIG. 5 shows an embodiment of a hot routine address translation table with respect to the hot routines shown in FIGS. 3 and 4;

DETAILED DESCRIPTION OF THE INVENTION

Reference will now be made in detail to the example embodiments of the present invention, examples of which are illustrated in the accompanying drawings. However, the present invention is not limited to the embodiments illustrated herein after, and the embodiments herein are introduced to provide easy and complete understanding of the scope and spirit of the present invention.

Figure 1:
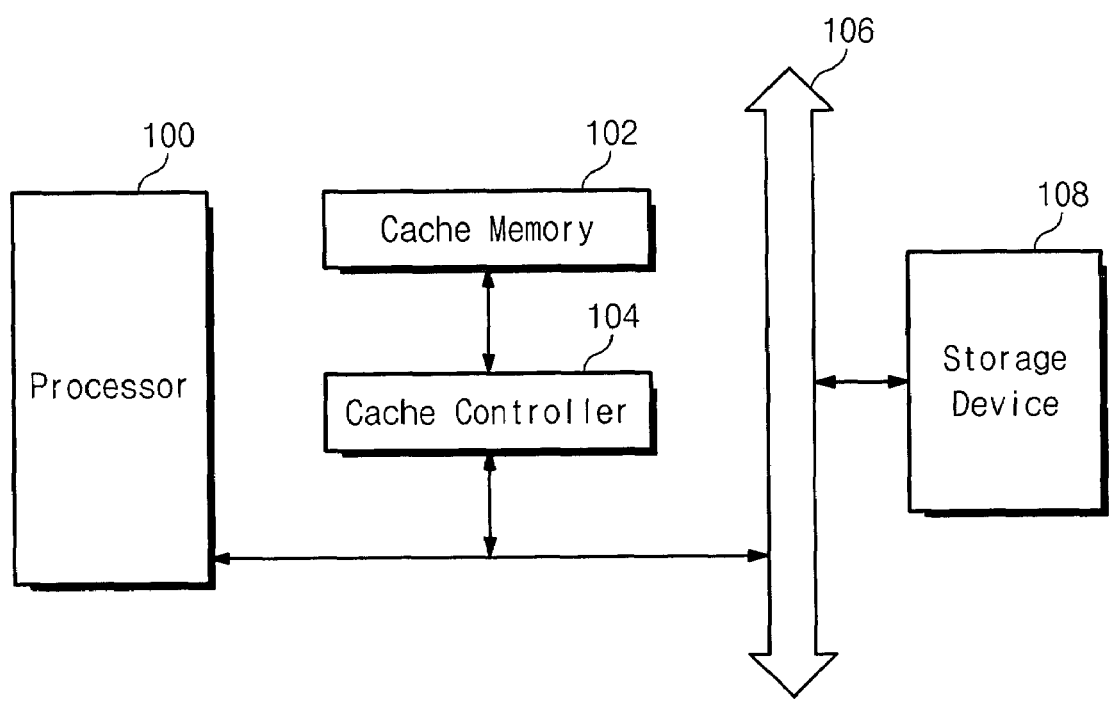
FIG. 1 is a block diagram of a conventional microprocessor system including a cache memory.
Figure 2:
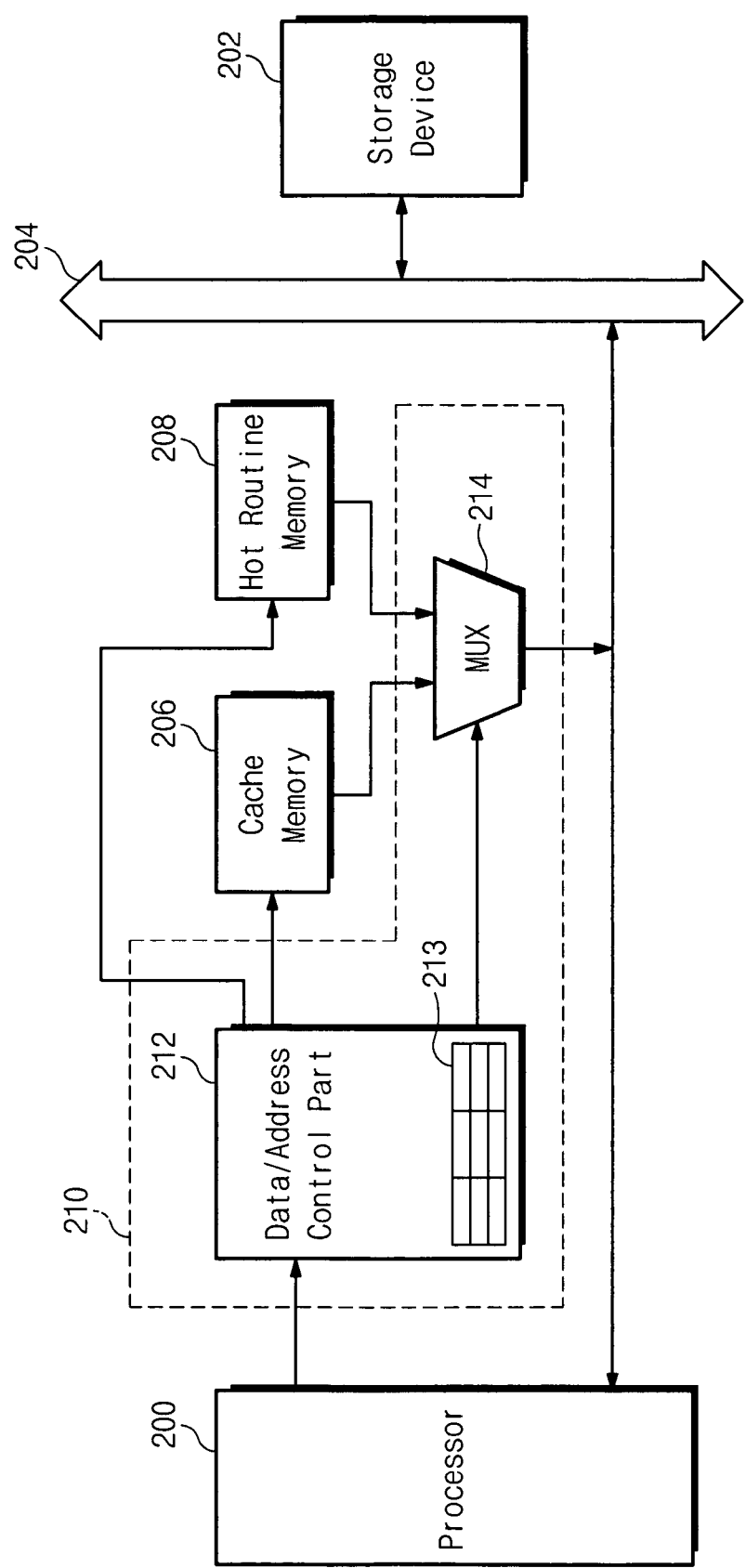
FIG. 2 is a block diagram showing an embodiment of a microprocessor system including a hot routine memory in accordance with an embodiment of the present invention.

FIG. 2 is a block diagram showing an embodiment of a microprocessor system including a hot routine memory in accordance with the present invention. As shown in FIG. 2, the microprocessor system of the present invention includes a processor 200, a storage device 202, a memory controller 210, a cache memory 206 and a hot routine memory 208. Each of the devices is connected through a bus 204.

The processor 200 reads information (e.g., data and commands) from the storage device 202 and executes an application program. In the present invention, a portion of the information requiring high frequency of use and fast response time is defined as a hot routine, previously at an initial application programming. Namely, the application program designates which information constitutes a hot routine. If an application program including a hot routine is executed by the processor 200, the processor 200 reads the information corresponding to the hot routine from the storage device 202 first, before execution of the application program, and then stores the read information in the hot routine memory 208 through a data/address control part 212 of the memory controller 210. In addition, address information about an exact position of the hot routine in the hot routine memory 208 is stored in a hot routine address translation table 213 of the data/address control part 212. For example, as shown in FIG. 3, if application programs including the hot routine are to be executed by the processor 200, the processor 200 stores information correspond to the hot routines through the data/address control part 212 of the memory controller 210.

More specifically, referring to FIG. 3, if a program B is loaded by the processor 200, the processor 200 stores a portion 302 (HR2), which is defined as the hot routine in the program B, in the hot routine memory 208. In addition, the processor 200 records, in the hot routine address translation table 213, address information for mapping an exact position of the hot routine data HR2 in the hot routine memory 208 to the address in the storage device 202. Then, if a program A is loaded, the processor 200 maintains the hot routine data HR2 of the program B, which are stored in the existing hot routine memory 208, and then adds and stores a hot routine data HR1 of the program A in the above manner. Address information for mapping an exact position about the hot routine data HR1 of the program A in the storage device to the position in the hot routine memory 208 is stored in the hot routine address translation table 213 of the data/address control part 212.

FIG. 4 shows a hot routine memory where hot routines of each application program A and B are stored. FIG. 5 shows a hot routine address translation table for the case where the hot routines stored in the hot routine memory are as shown in FIG. 4. As shown in FIG. 5, a start address of an exact position of the hot routine data in the storage device (e.g., program address used by a microprocessor) and start and end addresses of the hot routine in the hot routine memory 208 are stored in the hot routine address translation table 213. Then, if the program A is executed, the data/address control part 212 senses whether the processor 200 is requesting a hot routine. The processor 200 requests information using the storage device or program address of the hot routine. The data/address control part 212 determines if this address exists in the hot routine address translation table 213. Namely, based on the information in the hot routine memory, the data/address control part 212 knows the program address corresponding to the start address of a hot routine in the hot routine memory 208. The data/address control part 212 also knows the end address of the hot routine in the hot routine memory 208; and therefore, may determine the range of program addresses corresponding to an address of the hot routine in the hot routine memory 208. If the address information input from the processor 200 falls within such a range of program addresses, the data/address controller 212 controls a mux circuit 214 so as to transfer information stored in the hot routine memory 208 to the processor 200 using the corresponding hot memory address determined using the table 213. If the address information input from the processor 200 does not match an address of a hot routine, the data/address control part 212 attempts to retrieve the information from the cache memory 206 in the conventional manner. In this case, if pertinent information exists in the cache memory 206, the data/address control part 212 controls the mux circuit 214 so as to transfer the information stored in the cache memory 206 to the processor 200. If information matching the address information input from the processor 200 does not exist in the hot routine and cache memories 208 and 206, the processor 200 reads the information from the storage device 202 and then temporarily stores the executed information in the cache memory 206 through the data/address control part 212.

Figure 6:
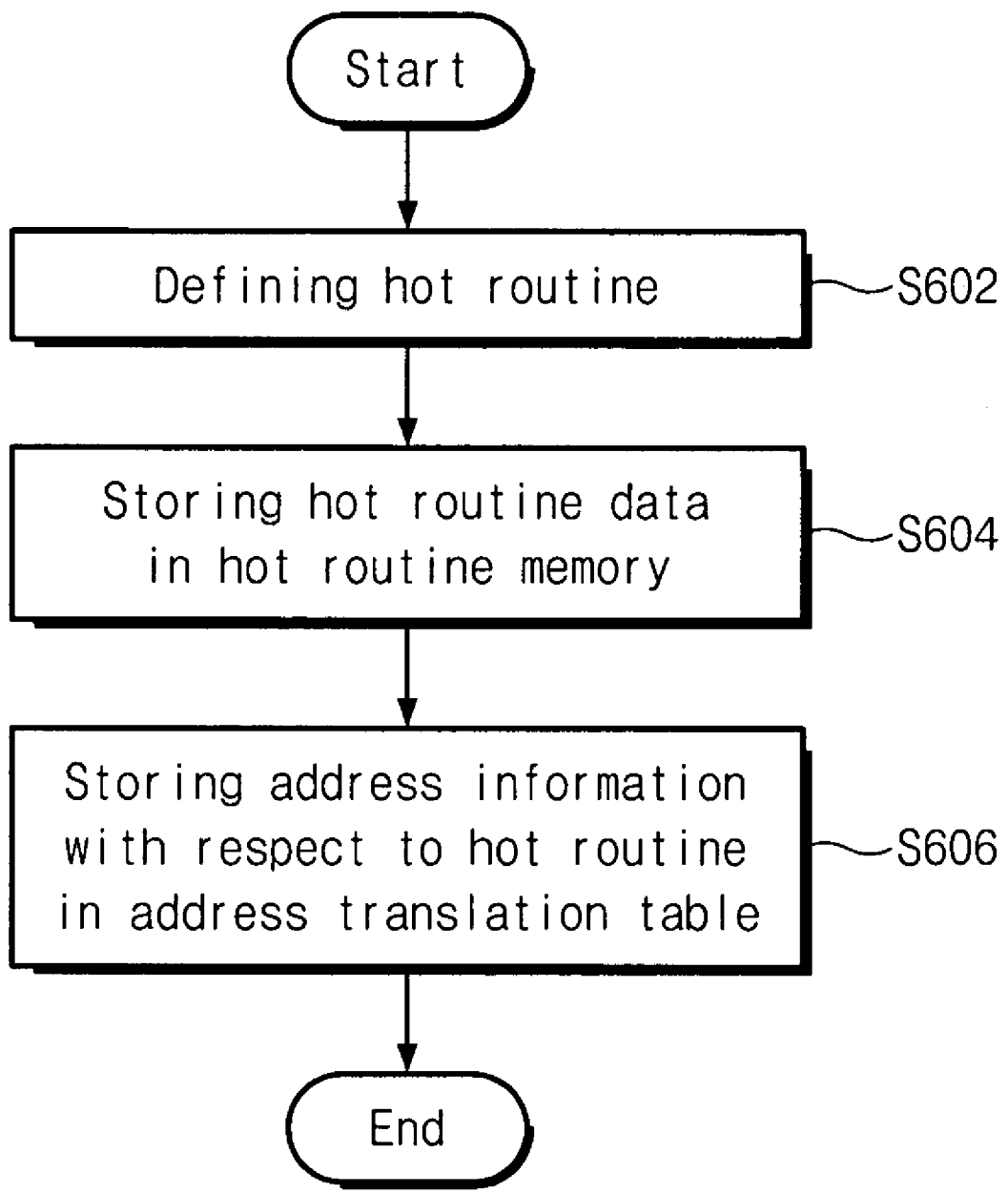
FIG. 6 is a flowchart illustrating a method of storing hot routines in a microprocessor system of the present invention.

FIG. 6 is a flowchart illustrating a method of storing hot routines in a microprocessor system of the present invention. As shown, when a programmer programs an application program, he previously defines a portion requiring high frequency of use and fast response speed as a hot routine (step S602). Next, in executing the application program, the processor 200 reads the portions defined as the hot routine by the program from the storage device 202 and then stores them in the hot routine memory 208 through the data/address control part 212 (step S604). Additionally, address information about an exact position of a program with respect to the hot routine in the storage device 202 and a position in the hot routine memory 208 is stored in the hot routine address translation table 213 (step S606).

Figure 7:
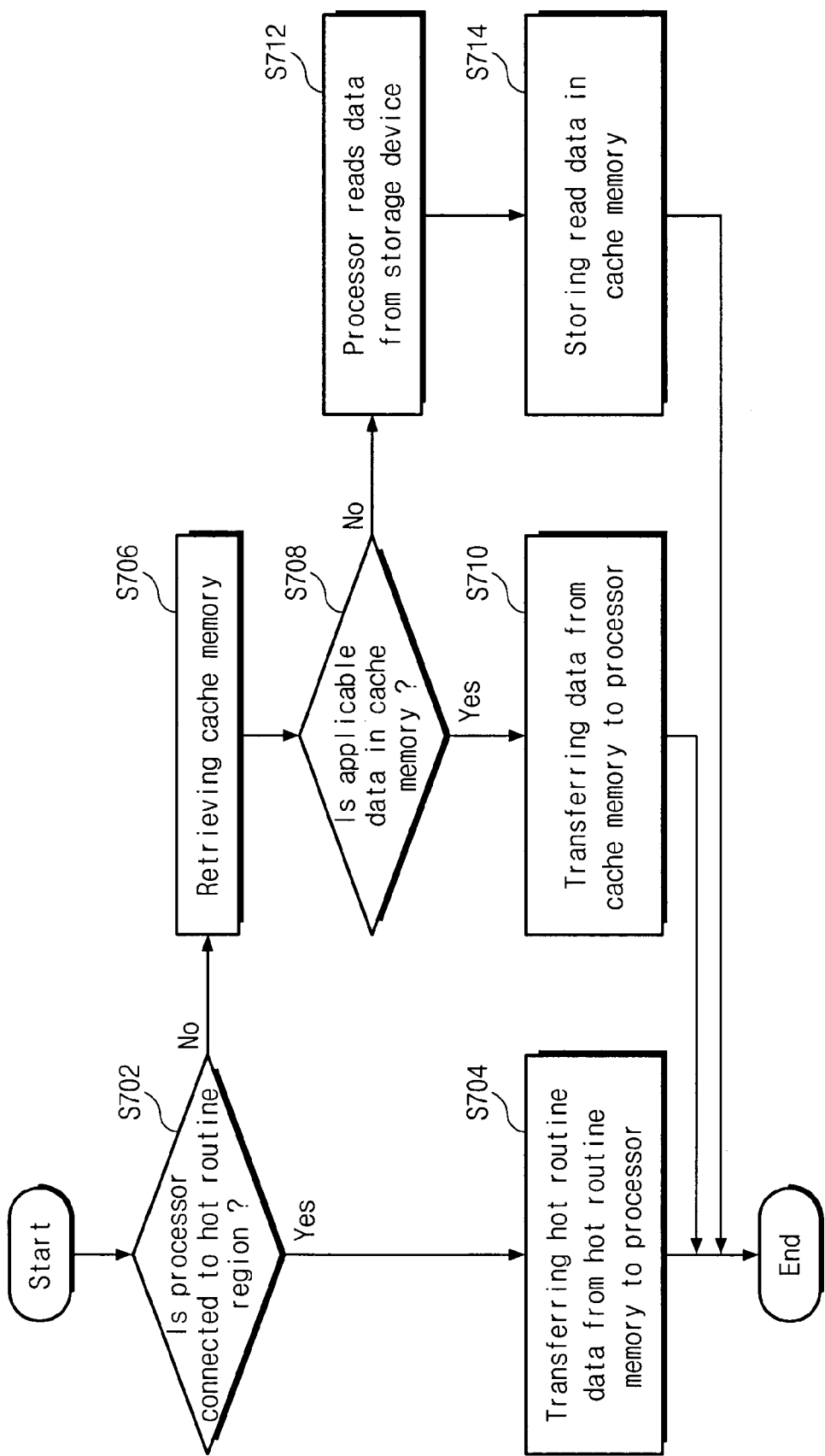
FIG. 7 is a flowchart showing an execution process of the application program in the microprocessor of the present invention after data corresponding to a hot routine is stored in the hot routine memory.

FIG. 7 is a flowchart showing an execution process of the application program in the microprocessor of the present invention after data corresponding to the hot routine is stored in the hot routine memory 208 through a process shown in FIG. 6. Referring to FIG. 7, in executing the application program, the data/address control part 212 receives address information input from the processor 200 and determines if this matches an address of a hot routine using the hot routine address translation table 213 (step S702). Namely, based on the information in the hot routine memory, the data/address control part 212 knows the program address corresponding to the start address of a hot routine in the hot routine memory 208. The data/address control part 212 also knows the end address of the hot routine in the hot routine memory 208; and therefore, may determine the range of program addresses corresponding to an address of the hot routine in the hot routine memory 208. If the processor 200 is requesting a hot routine, the data/address control part 212 transfers the hot routine stored in the hot routine memory to the processor 200 via the mux circuit 214 (step S704). If the address information input from the processor 200 does not correspond to a hot routine, the data/address control part 212 decides whether pertinent information is in the cache memory 206 (step S708). If pertinent data exists in the cache memory 206, the data/address control part 212 transfers information from the cache memory 206 to the processor 200 (step S710). Furthermore, if the address input from the processor 200 does not correspond to information in either the hot routine memory 208 or the cache memory 206, the processor 200 connects to the storage device 202 to access the pertinent information (step S712), and then temporarily stores the executed information in the cache memory 206 (step S714).

As previously mentioned, according to the microprocessor system of the present invention, an operation speed of the system may be improved even when the application program that is executed by the processor changes. Furthermore, it is possible for the system to be operated stably.

It will be apparent to those skilled in the art that various modifications and variations may be made in the present invention. Thus, it is intended that the present invention covers the modifications and variations of this invention.

What is claimed is:

1. A microprocessor system, comprising:
    a processor;
    a hot routine memory, controlled by the processor, configured to store a portion of information stored in a storage device designated by the application program as a hot routine;
    a controller configured to include address translation information providing translation between an address of the hot routine in the storage device and an address of the hot routine in the hot routine memory; wherein
    the processor is configured to read the portion of information designated by the application program as the hot routine from the storage device if the application program is executed by the processor and store the portion of information in the hot routine memory before execution of the application program,
    the processor is configured to execute the application program and request information after the portion of information is stored in the in the hot routine memory, and
    the controller is configured to control the hot routine memory to output the requested information to the processor if the controller determines from the address translation information that the hot routine memory stores the requested information.

2. The microprocessor system of claim 1, wherein a hot routine is information for which a fast response speed and a high connection frequency in executing the application program is desired.

3. The microprocessor system of claim 1, wherein the controller includes a hot routine address translation table, and the hot routine address translation table includes a start address of the hot routine in the storage device and a start and end addresses of the hot routine in the hot routine memory.

4. The microprocessor system of claim 1, further comprising:
    a cache memory, controlled by the processor, configured to store information previously used by the processor in executing the application program.

5. The microprocessor system of claim 4, wherein the controller controls the cache memory to output the requested information when the controller determines that the hot routine memory does not store the requested information and the cache memory does store the requested information.

6. The microprocessor of claim 4, wherein the controller includes a hot routine address translation table, and the hot routine address translation table includes a start address of the hot routine in the storage device and a start and end addresses of the hot routine in the hot routine memory.

7. The microprocessor system of claim 1, wherein the hot routine memory continues storing the hot routine even when the application program being executed changes.

8. The microprocessor system of claim 1, further comprising:
    the storage device, connected to the processor, configured to store the information for executing the application program.

9. The microprocessor system of claim 1, wherein
    the processor is configured to read a second portion of information designated by a second application program as a hot routine from the storage device if the second application program is executed by the processor and store the second portion of information in the hot routine memory before execution of the second application program, and
    the second application program is executed after the application program is executed.

10. A microprocessor system, comprising:
    a processor;
    a storage device, connected to the processor, configured to store information for executing an application program;
    a cache memory configured to store information used by the processor previously in executing the application program;
    a hot routine memory configured to store a portion of the information stored in the storage device designated by the application program as a hot routine; and
    a memory controller, connected to the cache and hot routine memories, configured to store information in the cache memory and the hot routine memory and configured to read out information stored in the cache memory and the hot routine memory, wherein the processor is configured to read the portion of information designated by the application program as the hot routine from the storage device if the application program is executed by the processor and store the portion of information in the hot routine memory before execution of the application program, the processor is configured to execute the application program and request information after the portion of information is stored in the in the hot routine memory, and the memory controller is configured to control the hot routine memory to output the requested information to the processor if the memory controller determines that the hot routine memory stores the requested information.

11. The microprocessor system of claim 10, wherein the memory controller controls the cache memory to output the requested information when the memory controller determines that the hot routine memory does not store the requested information and the cache memory does store the requested information.

12. The microprocessor of claim 10, wherein the memory controller determines that the hot routine memory stores the requested information using address translation information stored therein, the address translation information providing translation between an address of the hot routine in the storage device and an address of the hot routine in the hot routine memory.

13. The microprocessor system of claim 10, wherein the memory controller comprises:

a data/address controller for receiving address information from the processor to write information in the cache memory or the hot routine memory, and for reading information from the cache memory or the hot routine memory; and a mux circuit, controlled by the data/address controller, for transferring the information from the cache memory or the hot routine memory to the processor.

14. The microprocessor system of claim 13, wherein the data/address control part includes address translation information providing translation between an address of the hot routine in the storage device and an address of the hot routine in the hot routine memory.

15. The microprocessor system of claim 14, wherein the data/address controller includes a hot routine address translation table, and the hot routine address translation table includes a start address of the hot routine in the storage device and a start and end addresses of the hot routine in the hot routine memory.

16. The microprocessor system of claim 10, wherein a hot routine is information for which a fast response speed and a high connection frequency in executing the application program is desired.

17. The microprocessor system of claim 10, wherein the hot routine memory continues storing the hot routine even when the application program being executed changes.

18. A method of operating a microprocessor system, comprising:

reading information designated by an application program as a hot routine from a storage device if the application program is executed by a processor;

storing the information designated as the hot routine by the application program in a hot routine memory of the microprocessor system before execution of the application program;

executing the application program and requesting information after the information is stored in the hot routine memory; and controlling the hot routine memory to output the requested information to the processor if the hot routine memory stores the requested information.

19. The method of claim 18, further comprising:

storing information previously used by a processor of the microprocessor system in executing the application program in a cache memory.

20. The method of claim 19, further comprising:

controlling the cache memory to output the requested information when the hot routine memory does not store the requested information and the cache memory does store the requested information.

21. The method of claim 20, further comprising:

accessing the requested information from a storage device when the requested information is not stored in the cache memory and the hot routine memory.

22. The method of claim 19, wherein the controlling step includes accessing a translation table to determine if the requested information is in the hot routine memory, the translation table includes address translation information providing translation between an address of the hot routine in a storage device and an address of the hot routine in the hot routine memory.

23. The method of claim 22, wherein the hot routine address translation table includes a start address of the hot routine in the storage device and a start and end addresses in the hot routine address memory.

24. The microprocessor system of claim 18, wherein a hot routine is information for which a fast response speed and a high connection frequency in executing the application program is desired.

* * * * *